US007010516B2

(12) United States Patent
Leslie

(10) Patent No.: US 7,010,516 B2
(45) Date of Patent: Mar. 7, 2006

(54) METHOD AND SYSTEM FOR ROWCOUNT ESTIMATION WITH MULTI-COLUMN STATISTICS AND HISTOGRAMS

(75) Inventor: Harry Anthony Leslie, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 646 days.

(21) Appl. No.: 10/027,309

(22) Filed: Dec. 19, 2001

(65) Prior Publication Data

US 2003/0135485 A1  Jul. 17, 2003

(51) Int. Cl.
*G06F 17/30* (2006.01)

(52) U.S. Cl. .............................. 707/2; 707/3; 707/101; 707/102; 707/103 R

(58) Field of Classification Search ............. 707/1–10, 707/100–104.1, 200–206
See application file for complete search history.

(56) References Cited

U.S. PATENT DOCUMENTS

| 6,029,163 | A  | * | 2/2000 | Ziauddin .................. 707/2 |
| 6,272,487 | B1 | * | 8/2001 | Beavin et al. ............. 707/2 |
| 6,363,371 | B1 | * | 3/2002 | Chaudhuri et al. ........ 707/2 |
| 6,529,901 | B1 | * | 3/2003 | Chaudhuri et al. ........ 707/3 |

* cited by examiner

*Primary Examiner*—Jean M. Corrielus
*Assistant Examiner*—Isaac M. Woo

(57) ABSTRACT

The invention provides methods for optimizing a database management system process of a query. The methods are suitable for execution in a properly configured computer system. In an embodiment of the invention, a plurality of single column statistics are collected for a plurality of columns. This plurality of single column statistics provides an estimate of row counts and unique entry counts for a singe column operator. A preferred single column statistic is selected from the plurality of single column statistics according to a predetermined criteria. The preferred single column statistic is then stored. A selectivity estimate is then determined for predicates in the query using the preferred single column statistic. The selectivity estimate is used in optimizing processing of the query by the database management system.

17 Claims, 5 Drawing Sheets

| MGRNM 508 | MGRSSN 514 | DEPT 516 | ... | ... | ... | ... | ... |
|---|---|---|---|---|---|---|---|
| | | | | | | | ◄ |
| | | | | | | | ◄ |
| | | | | | | | ◄ |
| 510 { | 516 { | 518 { | | | | | ◄ |
| | | | | | | | ◄ |
| | | | | | | | ◄ |
| | | | | | | | ◄ |

T1 502

532

| EMPNM 520 | EMPSSN 524 | DEPT 528 | ... | ... | ... | ... | ... |
|---|---|---|---|---|---|---|---|
| | | | | | | | ◄ |
| | | | | | | | ◄ |
| | | | | | | | ◄ |
| 522 { | 526 { | 530 { | | | | | ◄ |
| | | | | | | | ◄ |
| | | | | | | | ◄ |
| | | | | | | | ◄ |

T2 504

534

| MGRNM 508 | MGRSSN 514 | DEPT 516 | EMPNM 520 | EMPSSN 524 | DEPT 528 | ... | ... |
|---|---|---|---|---|---|---|---|
| | | | | | | | ◄ |
| | | | | | | | ◄ |
| | | | | | | | ◄ |
| 510' { | 516' { | 518' { | 522' { | 526' { | 530' { | | ◄ |
| | | | | | | | ◄ |
| | | | | | | | ◄ |
| | | | | | | | ◄ |

METHOD AND SYSTEM FOR ROWCOUNT ESTIMATION WITH MULTI-COLUMN STATISTICS AND HISTOGRAMS

FIELD OF THE INVENTION

The present invention relates to the field of database management systems. More particularly, the present invention relates to the field of database query optimizers.

BACKGROUND OF THE INVENTION

Computers have the capability of storing vast amounts of data. For example, computers can store and retain data related to thousands of employees of large multi-national corporations, including the departments in which they work, their employee numbers, salaries, job descriptions, geographical locations, etc. This data is often stored in the form of tables in a relational database. In order to extract selected portions of that data from such large computerized databases, users can present a query to the database system in the form of a Structured Query Language (SQL) statement. For example, an SQL statement may be used to ask the database system to list the names of all employees having employee numbers 1001 to 2000. A properly structured SQL statement will result in a list of records that satisfies the question or "query." SQL uses the terms table, row, and column for relation, tuple, and attribute, respectively. Those of skill in the art understand that the terms can be used interchangeably without loss of clarity.

Once a user inputs an SQL query into the computer, an SQL compiler operates on the SQL query to develop an efficient way to extract the desired information from the database. Typically, the SQL compiler converts the SQL statement into a number of relational operators stored in computer memory in the form of a query tree. Each node of the tree represents a relational operator, such as a "sort" or "merge" operator. The optimizer portion of the compiler explores a large number of different logically equivalent forms of the query tree, called "plans", for executing the same query. The optimizer program selects, for example, the plan with the lowest estimated cost to respond to the query, and that plan is then executed. In database parlance, "cost" is usually measured in terms of the amount of computer resources utilized by the computer in executing the SQL statement, for example, the number of I/O's or CPU instructions.

The prior art has focused on various techniques, such as the use of histograms, for developing statistics to describe the distribution of data in the database tables upon which the database programs operate. Generally, a histogram in this context is a collection of statistics describing a frequency distribution for values in a database over various intervals. It has been recognized that gathering accurate statistics about the data in the tables is important for estimating row selectivity. However, both predicate and relational operators can affect row selectivity and unique entry counts (UEC, Uec, or uec, to be used interchangeably) that are returned by an operator as the associated algorithm processes the query. A unique entry count is a number of the unique entries in an interval or column. As known in the art, predicates in SQL can be, for example, a "basic" predicate which compares two values (e.g., x=y, x is equal to y; x< >y, x is not equal to y; x<y, x is less than y; x>y, x is greater than y; x>=y, x is greater than or equal to y; and, x<=y, x is less than or equal to y); a "quantified" predicate which compares a value or values with a collection of values; a "between" predicate which compares a value with a range of values; an "exists" predicate which tests for the existence of certain rows; or an "in" predicate which compares a value or values with a collection of values. Also as known in the art, relational operators in SQL can be, for example, a "selection" which is used to find all tuples that satisfy a specified selection condition; a "projection" which is used to return, for each tuple, the values under specified attributes; a "cartesian product" which returns a new relation, R3, that contains tuples that can be obtained by concatenating every tuple in one relation, R1, with every tuple in another relation, R2; a "union" which returns all tuples that belong to either one relation, R1, or another relation, R2; a "set difference" which returns all tuples that belong to one relation, R1, but not another relation, R2; a "set intersection" which returns all tuples that belong to both one relation, R1, and another relation, R2; a "join" which returns all tuples in a cartesian product of two relations, R1×R2, satisfying a specified join condition, C, consisting of one or more basic join conditions connected by logical operators (each basic join condition compares attribute values of tuples from different relations); and, a "division" which returns tuples whose concatenation with every tuple of one relation, R1, is in another relation, R2.

The ability to accurately predict the number of rows and UECs returned by both relational operators and predicates is fundamental to computing the cost of an execution plan. The estimated cost, of course, drives the optimizer's ability to select the best plan. Accordingly, there is a need for a method and apparatus that, not only accurately assembles statistics about the tables of raw data to be processed by the database software, but also for a method and apparatus that can accurately predict the number of rows and UECs for each histogram interval that will be returned by any predicate or relational operator in a query tree.

SUMMARY OF THE INVENTION

These and other objectives are achieved in the present invention by providing methods for optimizing a database management system process of a query. In an embodiment of the invention, a plurality of single column statistics are collected for a plurality of columns. This plurality of single column statistics provides an estimate of row counts and unique entry counts (UECs) for a singe column operator. Moreover, a preferred single column statistic is selected from the plurality of single column statistics according to a predetermined criteria. The preferred single column statistic is then stored. A selectivity estimate is then determined for predicates in the query using the preferred single column statistic. The selectivity estimate is used in optimizing processing of the query by the database management system. In another embodiment of the invention, the single column statistics are selectivities. In yet another embodiment of the invention, the predetermined criteria is a maximum of unique entry counts.

In yet another embodiment of the invention, a plurality of single column statistics are collected for a plurality of columns. The plurality of single column statistics provide an estimate of row counts and unique entry counts for a singe column operator. A first preferred single column statistic is selected from the plurality of single column statistics according to a first predetermined criteria. A second preferred single column statistic is also selected from a first relationship of the single column statistics. The first and second preferred single column statistics are then stored. A selectivity estimate is then determined for predicates in the query using the first and second preferred single column statistics, the selectivity estimate being used in optimizing processing of the query by the database management system. In another embodiment of the invention, the first relationship is a product of single column statistics. In yet another embodiment of the invention, the plurality of single column statistics are selectivities. In another embodiment of the invention, the selectivity estimate is within a range between the first and second preferred single column statistics.

In yet another embodiment of the invention, a plurality of single column statistics are collected for a plurality of columns. The plurality of single column statistics provide estimates for row counts and unique entry counts for a singe column operator. A first selectivity estimate is determined based on an assumption that the columns are substantially independent of each other. A second selectivity estimate is determined based on an assumption that the columns are substantially dependent on each other. A third selectivity estimate is then determined for predicates in the query using the first and second selectivity estimates, the selectivity estimate being used in optimizing processing of the query by the database management system. In another embodiment of the invention, the third selectivity estimate is within a range between the first and second selectivity estimates.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 5 is an illustration of a join operation using information collected in two database tables for managers and employees of a company.

DETAILED DESCRIPTION OF THE INVENTION

The present description is made for the purpose of illustrating the general principles of the invention, and is not to be taken in a limiting sense. The scope of the invention is best determined by reference to the appended claims and equivalents thereof.

1. Overview of the Computer System

Figure 1:
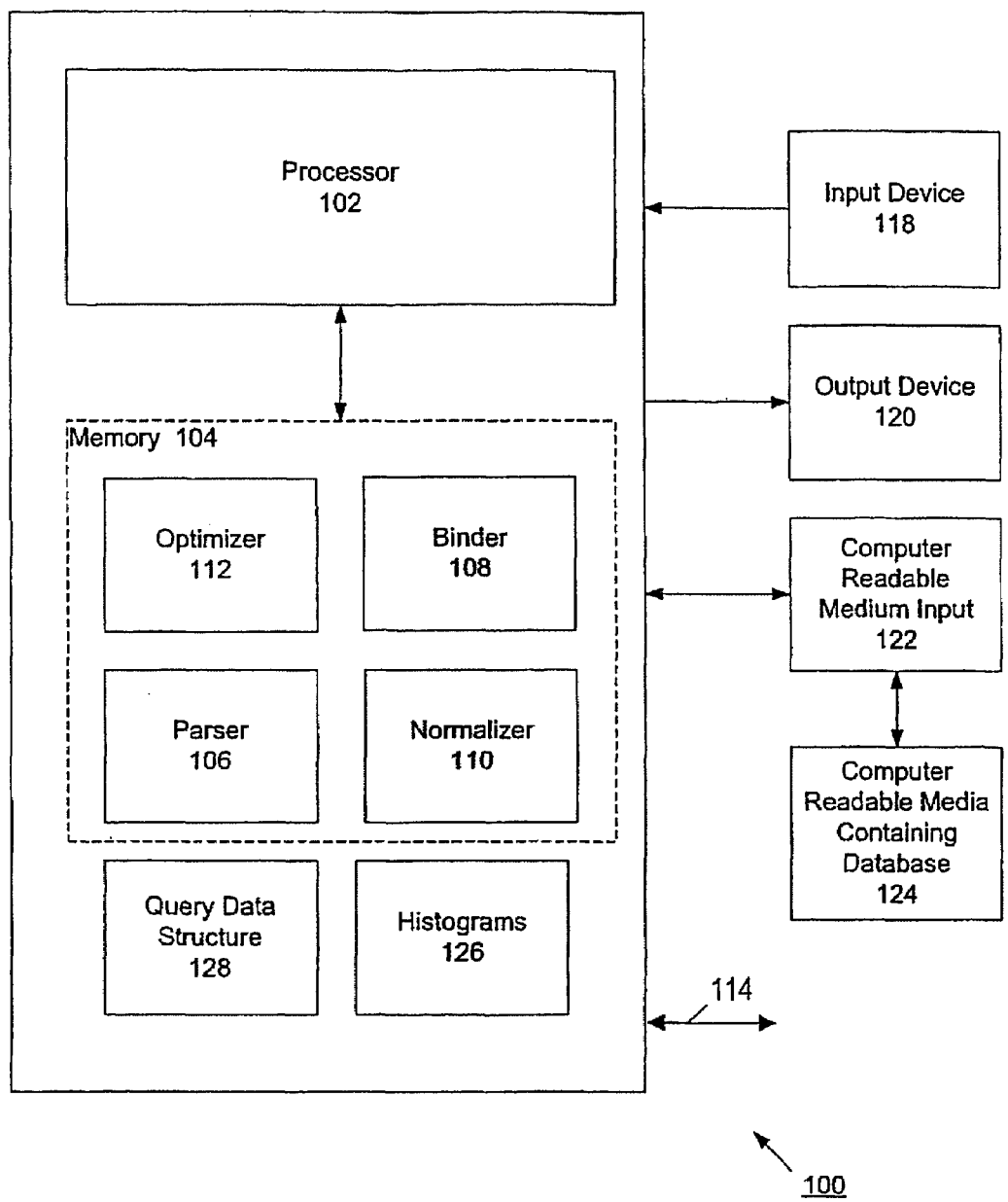
FIG. 1 is a block diagram of a computer system according to an embodiment of the invention.

The present invention can be implemented on a computer system, such as data processing system 100 shown in FIG. 1. Data processing system 100 has at least one processor 102 and associated computer memory 104. Memory 104 includes Structured Query Language (SQL) compiler 105 having at least parser 106, binder 108, normalizer 110 and optimizer 112 software components for implementing the tasks described herein. The described embodiments of the present invention can be performed when instructions contained in memory 104 are executed by processor 102 or other appropriate processors. As set forth in greater detail below, compiler 105 may operate on query data structure 128 and associated histograms 126 in the performance of the functions of the present invention.

When a user inputs a query into data processing system 100, SQL compiler 105 can operate on the query to produce an executable query plan. The compiling process typically includes a number of discrete steps which are handled by different components of compiler 105. First, the parser component 106 of compiler 105 verifies the syntax of the original SQL statement. If the syntax is correct, it produces a syntactically correct query tree. Binder component 108 then checks the semantic content of the tree. Then, normalizer component 110 transforms the semantically correct query tree into canonical form. The canonical tree represents, typically, a very large number of logically equivalent ways of processing the query posed by the SQL statement. Optimizer component 112 then operates on the canonical tree to generate the set of the logically equivalent query trees. Optimizer 112 then estimates the cost associated with carrying out each plan and selects the plan that best achieves the desired goal.

Data processing system 100 also preferably includes network connection 114, such as a connection to a LAN or a WAN. System 100 includes input devices 118 such as a keyboard, touch screen, or the like. System 100 includes output device 120 such as a printer, display screen or the like. System 100 also includes computer readable medium input device 122 and computer readable media 124. Computer readable media 124 may be any appropriate medium that has instructions or data stored thereon. These instructions and data may be loaded from computer readable media 124 into computer memory 104. Instructions and data can also be loaded into memory in the form of a carrier wave, or by any other type of signal over network connection 114.

System 100 also includes an operating system (not shown). A person of ordinary skill in the art will understand that memory 104 and computer readable media 124 may contain additional information, such as other application programs, operating systems, other data, etc., which are not shown in the figure for the sake of clarity. It will be understood that data processing system 100 (or any other data processing system described herein) can include numerous elements not shown in FIG. 1, such as additional data, software and/or information in memory, disk drives, keyboards, display devices, network connections, additional memory, additional CPUs, LANs, input/output lines, etc.

2. Selectivity Assuming Independent Columns

Relational databases are organized into tables which consist of rows and columns of data. When discussing relational databases the rows of a table are called tuples. Moreover, a relational database will usually have many tables with each table having various rows and columns. It is these tables that provide access to large amounts of information in a relational database. Much of the utility of relational databases, therefore, comes from the ability to retrieve useful information in an efficient manner. It is optimizer 112 that determines how these efficiencies are to be achieved.

In determining an efficient manner for conducting a query, optimizer 112 must obtain an estimate for the number of qualified rows resulting from such a query. Estimates are generated for each predicate of a query. The three most frequently used relational operations in a query are selection, projection and join. A join, however, is the most computationally expensive operation that will be discussed further below. The estimate for the number of qualified rows is then used by the database management system to determine a best path for accessing the desired data. The expected size of a number of selected rows divided by the total number of rows is a ratio called "join selectivity," which is a property of each join condition. Note that "selectivity" or "row selectivity" is often used when referring to join selectivity.

As described above, a join operation returns all tuples in a cartesian product of two relations, R1×R2, satisfying a specified join condition, C, consisting of one or more basic join conditions connected by logical operators (each basic join condition compares attribute values of tuples from different relations). Thus, a join operation is used to combine related tuples from two relations into single tuples. This operation is very important for any relational database with more than a single relation because it allows for processing relationships among relations. FIG. 5 will be used to illustrate a join. Shown in FIG. 5 are two tables, T1 502 and T2 504. Table T1 502 is a collection of information that includes, among other things, a manager name (MGRNM) attribute 508 shown as a column 510 of table T1 502. Also, collected in table T1 502 is a manager social security (MGRSSN) attribute in column 514 and a department (DEPT) attribute 516 in column 518. Table T2 504 is a collection of information that includes an employee name (EMPNM) attribute 520 collected in column 522, an employee social security (EMPSSN) attribute 524 collected in column 526, and a department (DEPT) attribute 528 collected in column 530. As shown, table T1 502 has tuples 532 (or rows) for each manager and table T2 504 has tuples 534 for each employee. Suppose that the name of the manager for each employee in various departments is to be retrieved. To get the manager, each department tuple must be combined with the employee tuple where, for example, each employees social security number (EMPSSN) value matches the manager's social security number (MGRSSN) value in the department tuple. The results are then collected in table T3 506 with tuples 536 for the identified attributes. In SQL, this is done by using the join operation and then projecting the result over the necessary attributes of interest.

A major factor in providing a useful database management system is the estimation of the number of rows resulting from an operation (e.g., join, group-by, etc.). If the estimated number of rows (i.e., selectivity) accurately models the actual number of rows produced, the optimizer can select the best plan for executing a query. Prior art database management systems can make very poor estimates of selectivity because of an underlying assumption. For example, in a multi-column join operation, prior art systems assume that there is no relationship between the columns to be joined. Essentially these systems assume that the predicates are independent and evaluate them accordingly. This independence assumption, however, is often incorrect leading to a poor estimate of selectivity and, in turn, leading to a less than optimum access path determined by optimizer 112. An example illustrates this point. Consider the histogram information for two tables, T1 and T2:

In the above table, CurUecA and CurUecB are the current UECs after applying a predicate on columns A and B, respectively; InitUecA and InitUecB are the initial UECs before applying a predicate on columns A and B, respectively; Rows is the number of tuples for tables T1 and T2; Xprod is the cross products of tables T1 and T2; and A, B Uec are the unique entry counts for columns A and B. For evenly distributed data, the expected number of rows (i.e., selectivity) from joining T1.A=T2.A (i.e., select all rows where A in table T1 equals A in table T2) and T1.B=T2.B (i.e., select all rows where B in table T1 equals B in table T2; here "equal" is the one of the basic predicates described, supra) can be calculated using an assumption of independence. (SQL notation will be used in the present description, however, one of skill in the art understands that other query languages are also appropriate.) For T1.A=T2.A, the selectivity for column A, $S_A$, is calculated as follows:

$$S_A = 1/CurUecA * Xprod$$
$$= 1/102 * 80,000$$
$$= 784 \text{ rows.}$$

Likewise, for T1.B=T2.B, the selectivity for column B, $S_B$, is calculated as follows:

$$S_B = 1/CurUecB * Xprod$$
$$= 1/12 * 80,000$$
$$= 6,667 \text{ rows.}$$

Thus, the combined selectivity of these two joined columns, assuming independence of the columns, is calculated using the independent values CurUecA and CurUecB to produce an estimate of selectivity as follows:

$$S_{ij} = 1/CurUecA * 1/CurUecB * Xprod$$
$$= 1/102 * 1/12 * 80,000$$
$$= 65 \text{ rows.}$$

If the predicates were in fact independent, this prior art method would suffice. When in most cases, however, the columns are not independent, the estimated selectivity can lead to detrimental results. For example, if most of the values in T1 and T2 have the same value, then it is expected that the selectivity is much larger than 65 tuples that were predicted using an independence assumption. With a dramatically underestimated selectivity, an optimizer cannot provide a best path to access data in a database management system. The present invention, therefore, provides for the deficiencies of the prior art.

| Table | CurUecA | InitUecA | CurUecB | InitUecB | Rows | Xprod | A, B Uec |
|-------|---------|----------|---------|----------|------|-------|----------|
| T1    | 101     | 101      | 12      | 12       | 200  | 80000 | 300      |
| T2    | 102     | 102      | 06      | 06       | 400  | 80000 | 400      |

3. Selectivity Assuming Complete Dependence of Joined Columns

Whereas prior art systems, as described above, assume complete independence between joined columns, an embodiment of the invention assumes complete dependence between joined columns in order to determine an estimated selectivity to be passed and used by optimizer 112 of FIG. 1. In implementing this embodiment, a minimum single column selectivity from columns A and B is chosen to produce an estimate of the join selectivity. Accordingly, a minimum selectivity value will produce a larger row selectivity (or join selectivity). In applying this method of the present invention to columns A and B, the row selectivity is estimated using the following equation:

$$S_{dj} = \text{MIN}(1/CurUecA, 1/CurUecB) * Xprod$$
$$= 1/102 * 80000$$
$$= 784 \text{ rows}$$

where the subscript dj denotes a completely dependent join and Xprod represents the cross product of columns A and B. We can rewrite the above equation by applying certain identities. We note that row selectivities for columns A and B are respectively the values:

RowSelA=1/CurUecA, and

RowSelB=1/CurUecB where

RowSelA is the row selectivity for column A, and

RowSelB is the row selectivity for column B.

Applying these identities, we can write $$S_{dj} = \text{MIN}(RowSelectA, RowSelectB) * Xprod$$
$$= 1/102 * 80000$$
$$= 784 \text{ rows.}$$

Moreover, note that the above equation is equivalent to choosing a maximum single column current UEC such that the applied equation can be written in an alternative form:

$$S_{dj} = 1/\text{MAX}(CurUecA, CurUecB) * Xprod$$
$$= 1/102 * 80000$$
$$= 784 \text{ rows}$$

where $S_{dj}$ is the selectivity as defined above.

It has been found that where skew and possible row and UEC reduction can be ignored this estimate provides a much improved estimate of selectivity than one derived assuming complete independence. Where such conditions are met, the estimated selectivity of 784 rows is much improved from the dramatic underestimate for selectivity of 65 rows obtained using the prior art method.

Figure 2:
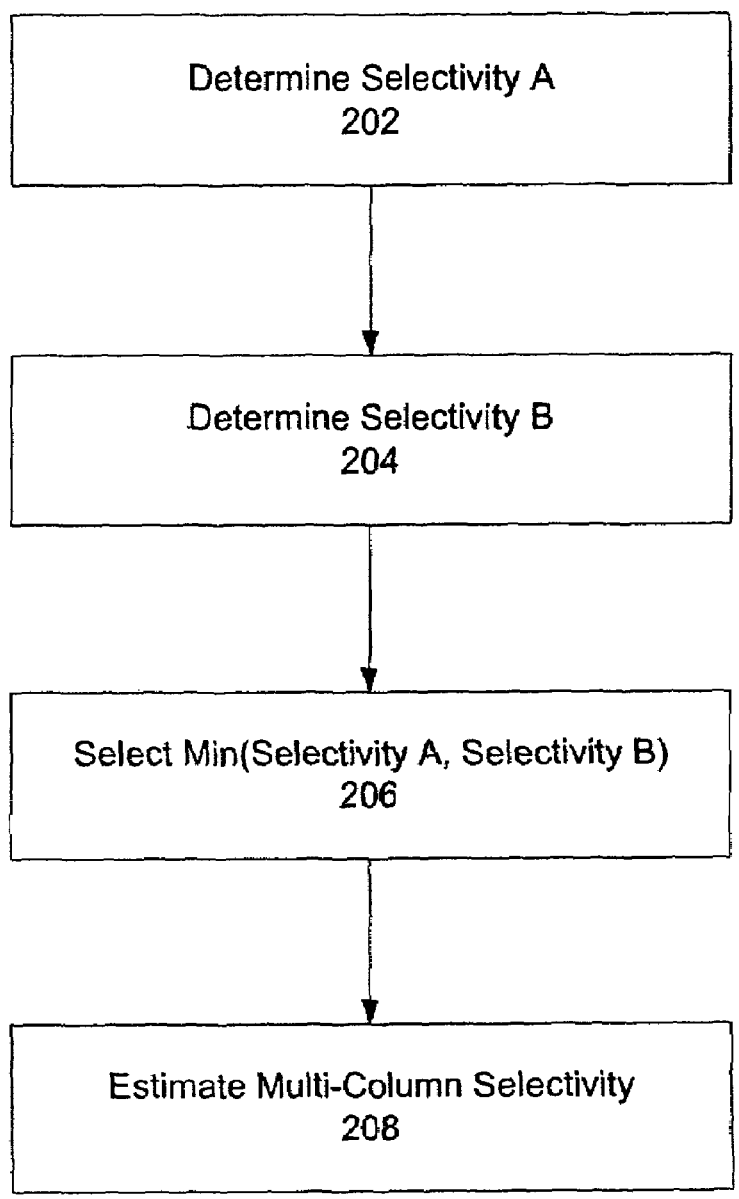
FIG. 2 is a flowchart of a method for estimating a join selectivity assuming complete independence of the columns being joined according to an embodiment of the invention.

FIG. 2 provides a flowchart for a method 200 of implementing the embodiment of the invention applying the above equations. As shown in FIG. 2, a row selectivity for column A is determined at step 202 and a row selectivity for column B is determined at step 204. At step 206, a minimum from the row selectivity of A and the row selectivity of B is selected. An estimated selectivity is then estimated at step 208 using the minimum selectivity chosen at step 206.

In another embodiment of the invention, an estimated join selectivity is calculated by choosing within a range of selectivities calculated assuming complete independence and complete dependence. This method of the invention essentially applies a linear interpolation between the values obtained using assumptions of complete independence and complete dependence. In one implementation, a variable, x, is chosen to have a range from 0 to 1, where a value of 0 corresponds to complete independence and a value of 1 corresponds to complete dependence. For purposes of notation, the estimate of selectivity assuming complete independence of a join operation is $S_{ij}$ (i.e, a completely independent join) and the estimate of selectivity assuming complete dependence of a join operation is $S_{dj}$ (i.e., a completely dependent join), such that an estimate of selectivity, $S_{xj}$, by applying a variable x is calculated as follows:

$$S_{xj}=(S_{dj}-S_{ij})*x+S_{ij},$$

where $0 \leq x \leq 1$.

With knowledge of a level of dependency between complete independence and complete dependence, a better estimate of selectivity is, therefore, possible through application of the above formula. Where columns are known to be independent, a value of x=0 is chosen. Where the columns are known to be completely dependent, a value of x=1 is chosen. Correlation or other statistics can be used to determine an intermediate value for x. Furthermore, where a measure of dependency is not known, a value of x=0.5 can be chosen. A value of x 0.5 is, therefore, a reasonable guess between complete independence and complete dependence.

Figure 3:
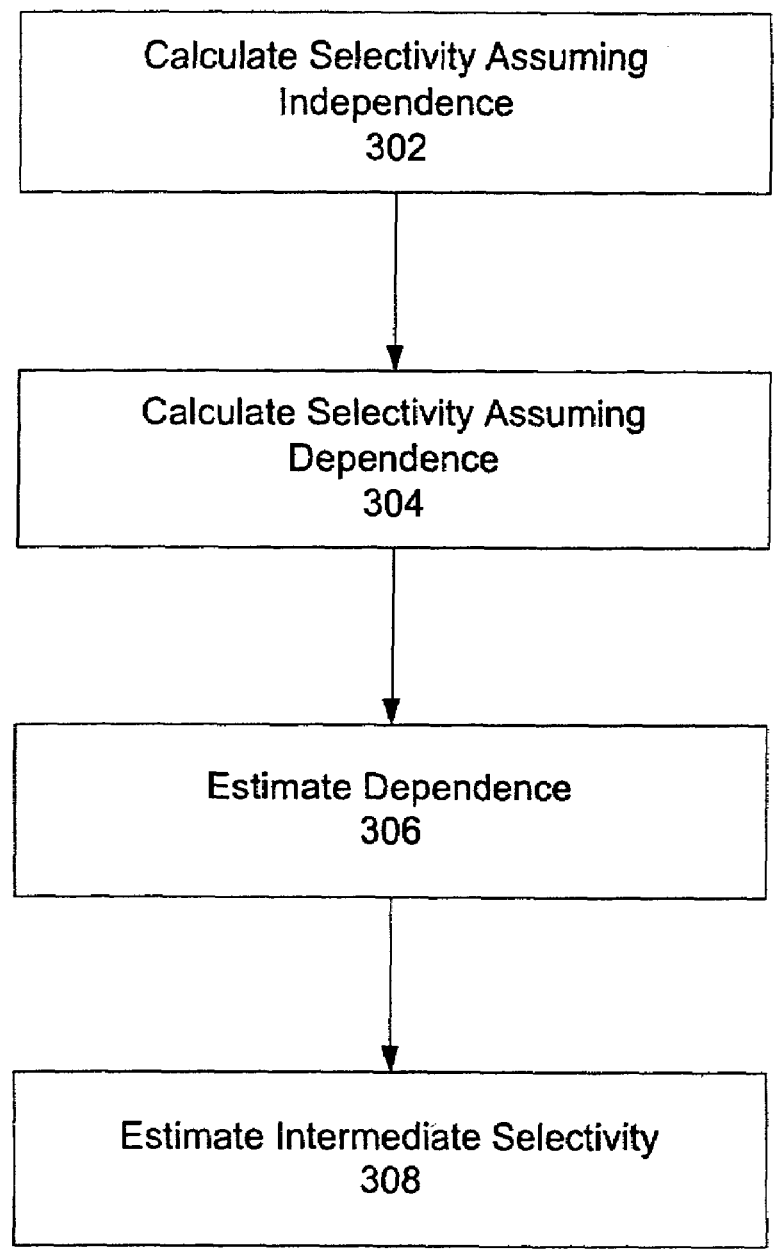
FIG. 3 is a flowchart of a method for estimating an intermediate selectivity between a selectivity obtained assuming complete independence of joined columns and a selectivity obtained assuming complete dependence of joined columns according to an embodiment of the invention.

FIG. 3 provides a flowchart for a method 300 of implementing the embodiment of the invention applying the above equation. As shown in FIG. 3, a selectivity, $S_{ij}$, assuming complete independence is calculated at step 302. At step 304, a selectivity, $S_{dj}$, is calculated assuming complete dependence. A measure for dependence is estimated at step 306. In an embodiment, this measure is a value x between 0 and 1. Using the information obtained in steps 302, 304 and 306, an estimated intermediate selectivity, $S_{xj}$, is calculated at step 308 using the equation $S_{xj}=(S_{dj}-S_{ij})*x+S_{ij}$.

4. Multi-Column Selectivity with Skew and Possible Row Reduction

The above-described calculations and methods of the invention can be implemented in another manner for more general applicability by accounting for variances in row selectivity (i.e., skew) and also reducing the multi-column selectivity based on the amount of UEC reduction done on the columns by other operations. Join skew occurs when the ratio of UEC to row count varies from interval to interval in a histogram which causes the total UEC selectivity to differ from the row selectivity. In one instance of this implementation, skew correction is achieved by application of the following formula:

SkewCorr=(RowSelA/UecSelA)*(RowSelB/UecSelB)

where row selectivity and UEC selectivity are as described supra. A skew-corrected estimate for selectivity is obtained by applying the following equation:

$$S_{SCj} = SkewCorr * Sdj$$

$$= SkewCorr * \text{MIN}(1/CurUecA, 1/CurUecB) * Xprod.$$

In applying the above equation to the histogram information presented above, we note that row selectivities and UEC selectivities are equal such that the skew correction is unity. The calculations bear this out:

$$SkewCorr = [(784/80,000)/(1/102)] * [(6667/80,000)/(1/12)]$$

$$= 1$$

and $$S_{SCj} = 1 * Sdj$$

$$= Sdj = 200 \text{ rows}.$$

Another example, using a histogram with skew illustrates the general applicability of this embodiment of the invention.

5. Multi-Column Joins with Skew

Recall that join skew occurs when the ratio of UEC to row count varies from interval to interval in a histogram which causes the total UEC selectivity to differ from the row selectivity. An example reaffirms this point: Consider the following histogram information:

Colvm T1.A

| Interval | CurUec | Rows | Xprod | Value |
|---|---|---|---|---|
| 0 | 0 | 0 | 0 | 0 |
| 1 | 1 | 100 | 40,000 | 25 |
| 2 | 100 | 100 | 40,000 | 150 |

Colvm T2.A

| Interval | CurUec | Rows | Xprod | Value |
|---|---|---|---|---|
| 0 | 0 | 0 | 0 | 0 |
| 1 | 2 | 200 | 40,000 | 25 |
| 2 | 100 | 200 | 40,000 | 150 |

In order to obtain, multi-column histogram information, we apply the following formula to each interval shown above:

(XprodT1.A)*(XprodT2.A)/MAX((CurUECT1.A), (CurUecT2.A))/(XprodT1.A+XpodT2.A).

These calculations generate the following joined histogram:

Column T1.A, T2.A

| Interval | CurUec | Rows | Value |
|---|---|---|---|
| 0 | 0 | 0 | 0 |
| 1 | 1 | 10,000 | 25 |
| 2 | 100 | 200 | 150 |

Here we can also calculate row selectivity and UEC selectivity in a similar manner as before:

RowselA=10,200/80,000=0.1275

UecselA=1/102=0.0098.

Comparing the results, we note that approximately 13 times as many rows as the total UEC selectivity would have been produced (i.e. RowselA/UecselA=13.005). It is this type of skew that the join skew formula corrects when applying multi-column UEC information. If we applied the multi-column formula without correcting for skew we would lose all join skew information.

Let us now consider the histograms for column B:

Column T1.B

| Interval | CurUuec | Rows | Xprod | Value |
|---|---|---|---|---|
| 0 | 0 | 0 | 0 | 0 |
| 1 | 10 | 100 | 40,000 | 25 |
| 2 | 2 | 100 | 40,000 | 35 |

Column T2.B

| Interval | CurUec | Rows | Xprod | Value |
|---|---|---|---|---|
| 0 | 0 | 0 | 0 | 0 |
| 1 | 2 | 200 | 40,000 | 25 |
| 2 | 4 | 200 | 40,000 | 35 |

We apply similar formulas to each interval above as for columns A:

(XprodT1.B)*(XprodT2.B)/MAX((CurUecT1.B), (CurUecT2.B))/(XprodT1.B+XprodT2.B)

Thus, the joined histogram is:

Column T1.B, T2.B

| Interval | CurUec | Rows | Value |
|---|---|---|---|
| 0 | 0 | 0 | 0 |
| 1 | 2 | 2,000 | 25 |
| 2 | 2 | 5,000 | 35 |

We can again compare the row and UEC selectivities of column B:

RowselB=7,000/80,000=0.0875

UecselB=1/14=0.0714

Here, we note a difference (i.e., RowselB/UecselB=1.225), although not as dramatic as for column A. The single column histogram information above can then be corrected to generate multi-column selectivity information.

In an embodiment of the invention, the above calculations can, therefore, be collected as an equation of general applicability. An estimate of multi-column selectivity according to the present invention is calculated using the following formula:

$$S_{MCj} = \frac{(sumOfMaxUecA)^2}{MaxinitA} * \frac{(sumOfMaxUecB)^2}{MaxinitB} * \frac{1}{MaxABuec} * rowselA * rowselB * xprod$$

where sumOfMaxUecA=Sum(Max(UecA)), sumOfMaxUecB=Sum(Max(UecB)),

MaxinitA=Max(T1.inituecA, T2.inituecA),

MaxinitB=Max(T1.inituecB, T2.inituecB), and

MaxABuec=Max(T1.ABuec, T2.ABuec).

Moreover, recall the equation for calculating single column join selectivity assuming independence of the two columns:

$S_{ij}$=RowSelA*RowSelB*Xprod.

The equation for multi-column selectivity is then simplified as follows:

$$S_{MCj} = \frac{(sumOfMaxUecA)^2}{MaxinitA} * \frac{(sumOfMaxUecB)^2}{MaxinitB} * \frac{1}{MaxABuec} * S_{ij}$$

This formula can be generalized to any number of join columns:

$$S_{MCj} = \frac{ProdUecSel}{ProdMaxInitUec} * \frac{1}{MaxMultiColUec} * S_{ij}$$

where

ProdUecSel=(sumOfMaxUecA$^2$*sumOfMaxUecB$^2$ . . . *sumOfMaxUuecZ)

ProdMaxInitUec=(MaxinitA*MaxinitB* . . . *MaxinitZ), and

MaxMultiColUec=Max(T1.AZuec,t2.AZuec, . . . Tz.A-Zuec).

Having shown the general formula, we can apply it to the present two column example being describe where:

MaxinitA=Max(T1.inituecA, T2.inituecA)=102

MaxinitB=Max(T1.inituecB, T2.inituecB)=12

MaxinitC=Max(T1.ABuec, t2.ABuec)=400 sumOfMaxUecA=100+2=102 sumOfMaxUecB=10+4=14, and $S_{ij}$=RowSelA*RowSelB*Xprod=10,200/80,000*7,000/80,000*80,000 such that $$S_{MCj} = 102^2/102 * 14^2/12 * 10,200/80,000 *$$
$$7,000/80,000 * 1/400 * 80,000$$
$$= 3717.$$

Note that the result of this calculation should not be less than 1 unless one of the factors is zero which is an anomalous situation.

a. Example of Skew

A case having reduced data and skew shows the full use of this formula. Consider the following histogram with skew:

| Table | CurUecA | InitUecA | CurUecB | InitUecB | Rows | Xprod | A,B uec |
|---|---|---|---|---|---|---|---|
| T1 | 101 | 101 | 12 | 12 | 200 | 80,000 | 300 |
| T2 | 102 | 202 | 06 | 12 | 400 | 80,000 | 400 |

Note that the only differences between this and the previous example without skew are InitUecA and InitUecB for T2 (noted in bold): InitUecA is now 202 rather than 102, and InitUecB is now 12 rather than 6. The detailed histograms, however, are not changed.

Applying the formula as before, we get the following:

$$S_{MCj} = 101^2/202 * 6^2/12 * 1/12 * 1/102 * 1/400 * 80,000$$
$$= 25.$$

Note that here it does not matter how the current UEC, CurUec, has been reduced; it only matters that the possible number of combinations for A,B has also been reduced. A predicate directly on column A is not treated differently than an indirect reduction of column A (by a predicate on another column in the table). Note that this type of multi-column selectivity for joins can only be used when there is information on multi-column selectivity for both tables being joined. This implies that both tables are joined on multiple columns.

Figure 4:
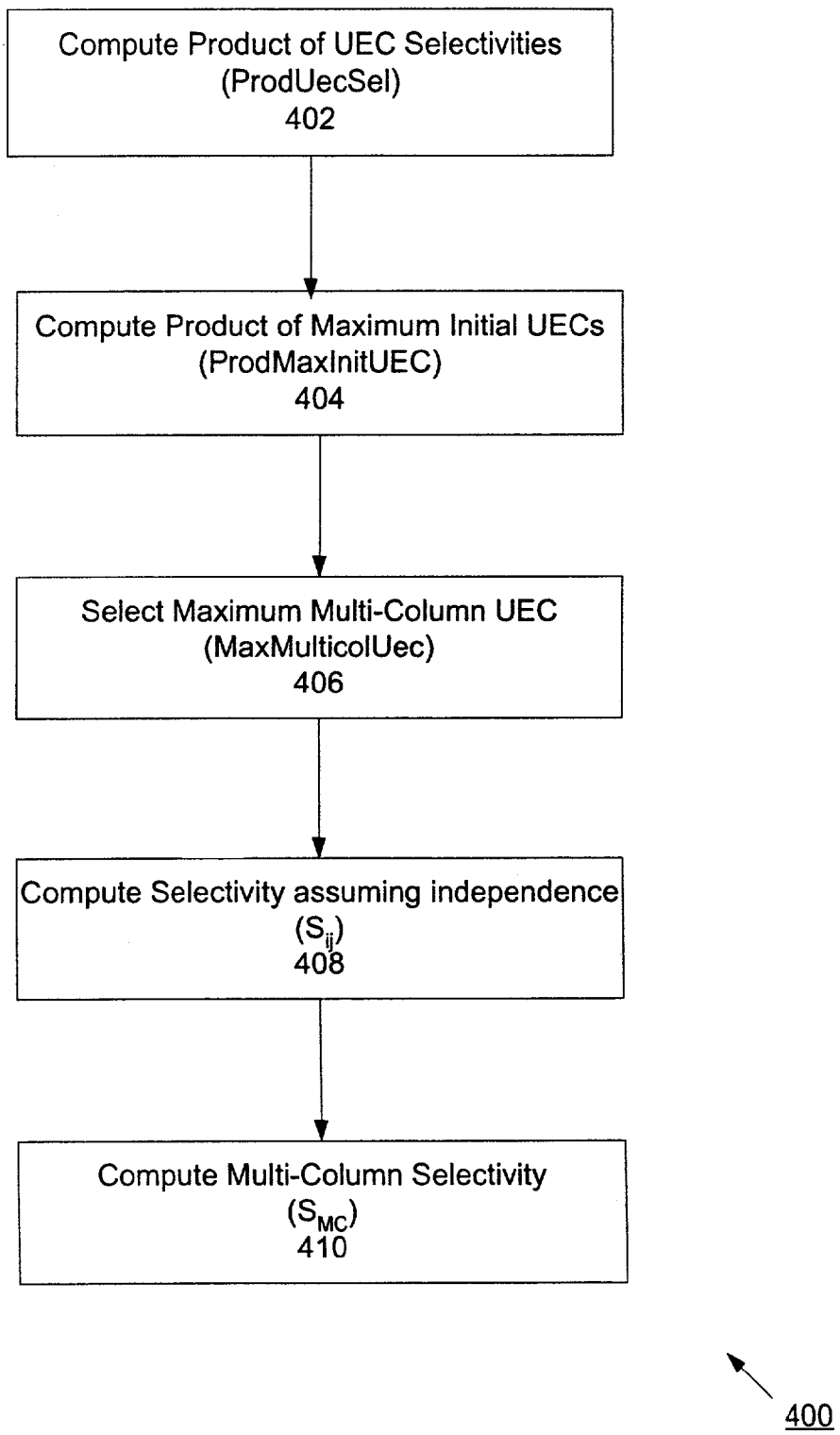
FIG. 4 is a flowchart of a general method for estimating a multi-column join selectivity with skew correction according to an embodiment of the invention.

FIG. 4 provides a flowchart for a method 400 of implementing the embodiment of the invention applying the above equations. As shown in FIG. 4, a product of UEC selectivities, ProdUecSel, is computed at step 402. A product of maximum initial UECs, ProdMaxinitUec) is calculated at step 404. At step 406, a maximum multi-column UEC is selected. At step 408, a selectivity, $S_{ij}$, is computed assuming complete independence of the columns upon which a predicate is being applied. Finally, at step 410, a multi-column selectivity $S_{MCj}$, is calculated by using the information obtained in steps 402–408 a selectivity and applying the equation:

$$S_{MCj} = \frac{ProdUecSel}{ProdMaxInitUec} * \frac{1}{MaxMultiColUec} * S_{ij}.$$

Note that an embodiment of the invention, performs the steps of FIGS. 2, 3 and 4 in the order shown, however, other embodiments of the invention, perform the indicated steps in different orders. In yet other embodiments, the steps of FIGS. 2, 3 and 4 are performed in substantially simultaneous or parallel sequences. One of skill in the art will understand that variations are possible without deviating from the teachings of the invention.

6. Multiple Single Table Predicates

Multi-column selectivity can also be used to improve multiple single table predicates although the improvements that are realized will be less dramatic than those described above. In this embodiment, a minimum number of rows for a group of columns can be calculated. Because single table predicates are only applied at the leaf nodes of a query tree, a given table has its original rowcount such that the minimum number of rows for each UEC combination is calculated as the ratio of its row count and its multi-column UEC as follows:

MinRows=RowCount/Multi-columnUec.

Note that this equation provides only a minimum rowcount. Other prior art methods exist for combining predicate selectivities for the general case of single table predicates but not joins.

Nested joins provide a special situation where nested join estimated cardinality is done in several phases. First, all single table predicates are applied in one call; then a cross product of rowcounts for the nested join is performed; finally, any additional predicates (i.e., joins) are applied.

7. Conclusion

Based upon the above explanation, it will be understood that the procedures comprising the present invention can produce a better estimate of the number of rows and UECs that will be produced by each operator or predicate and passed to a parent operator or predicate in the query tree. The parent may, in turn, pass its histograms to its parent operator or, in the case of a nested join, to its right, or inner, child operator. These row counts and UECs may be used by any of a variety of cost modeling software programs to predict the cost of various execution plans. The related patent application is incorporated herein by reference.

Several preferred embodiments of the present invention have been described. Nevertheless, it will be understood that various other modifications may be made to the described invention without departing from its spirit and scope. For example, the present invention is not limited to any particular implementation or programming technique, and the invention may be implemented using various techniques for achieving the functionality described herein. The invention may be implemented in any appropriate operating system using appropriate programming languages and/or programming techniques. Moreover, the present invention can be implemented in other situations including group-by and multi-dimensional access methods. Thus, the present invention is not limited to the presently preferred embodiments described herein, but may be altered in a variety of ways which will be apparent to persons skilled in the art based on the present description.

I claim:

1. A computer-implemented method for optimizing a database management system process of a query, the method comprising:
    collecting a plurality of single column statistics for a plurality of columns, the plurality of single column statistics providing estimates for row counts and unique entry counts for a single column operator;
    determining a first selectivity estimate as if the columns are substantially independent of each other;
    determining a second selectivity estimate as if the columns are substantially dependent on each other;
    determining a third selectivity estimate for predicates in the query using the first and second selectivity estimates, the third selectivity estimate being used in optimizing processing of the query by the database management system;
    wherein determining each of the first and second selectivity estimates comprises determining a cross product from the single column statistics;
    wherein determining the third selectivity comprises determining a measure of dependency between at least two columns; and
    wherein the third selectivity estimate is calculated based on the measure of dependency and a difference between the first and second selectivity estimates.

2. The method of claim 1, wherein the plurality of columns are substantially independent on each other.

3. The method of claim 2, wherein the third selectivity estimate is substantially equal to the first selectivity estimate.

4. The method of claim 1, wherein the plurality of columns are dependent on each other.

5. The method of claim 4, wherein the third selectivity estimate is substantially equal to the second selectivity estimate.

6. The method of claim 1, wherein the third selectivity estimate is within a range between the first and second selectivity estimates.

7. The method of claim 6, further comprising determining an estimate of a dependency of the columns.

8. The method of claim 7, wherein the estimate of the dependency of the columns is used to determine the third selectivity estimate.

9. The method of claim 1, wherein the third selectivity estimate is chosen to be in a central range between the first and second selectivity estimates.

10. A computer-implemented method for optimizing a database management system process of a query, the method comprising:
    collecting a plurality of single column statistics for a plurality of columns, the plurality of single column statistics providing estimates for row counts and unique entry counts for a single column operator;
    determining a first selectivity estimate as if the columns are substantially independent of each other;
    determining a first factor as a measure of a skew of the plurality of columns and as a measure of a dependence of a plurality of the columns; and
    determining a second selectivity estimate for predicates in the query using the first selectivity estimate and the first factor, the second selectivity estimate being used in optimizing processing of the query by the database management system;

wherein the first factor is determined by computing a product of unique entry count selectivities from a sum of maximum unique entry counts for the plurality of columns, computing a product of maximum initial unique entry counts for the plurality of columns, computing a ratio of the product of unique entry count selectivities and the product of maximum initial entry counts, selecting a maximum multicolumn unique entry count from multicolumn entry counts for the plurality of columns, and computing the first factor from a product of the ratio and an inverse of the maximum multicolumn unique entry count.

11. The method of claim 10, wherein the plurality of columns are substantially independent on each other.

12. The method of claim 11, wherein the second selectivity estimate is substantially equal to the first selectivity estimate.

13. The method of claim 10, wherein the plurality of columns are dependent on each other.

14. The method of claim 10, wherein the second selectivity estimate is a product of the first factor and the first selectivity estimate.

15. A data processing system, comprising:
a processor;
a memory coupled to the processor; and
wherein the memory stores a compiler that, when executed by the processor, determines a join selectivity value of columns based on a first selectivity value computed as if the two columns are dependent and a second selectivity value computed as if the two columns are independent, wherein the compiler performs a join operation based on the join selectivity value, wherein the compiler determines an intermediate selectivity value approximately halfway between the first selectivity value and the second selectivity value when a dependence between the two columns is unknown and wherein the compiler performs the join operation based on the intermediate selectivity value, and wherein the compiler determines the join selectivity of two columns further based on a cross product of row counts estimated for each of the two columns.

16. The data processing system of claim 15 wherein the row counts are estimated by a quantity of unique entry counts for each of the two columns.

17. A storage medium containing computer-readable instructions that are executable by a computer and cause the computer to:

produce a query tree based on a query posed by a computer language statement;

transform the query tree into a form that represents a number of logically equivalent methods of processing the computer language statement; and estimate a cost associated with carrying out each of the logically equivalent methods, wherein said estimate the cost comprises determining a join selectivity for two columns based on a first selectivity value computed as if the two columns are dependent, a second selectivity value computed as if the two columns are independent and, when an independence of the two columns is unknown, an intermediate value between the first selectivity value and the second selectivity value, and wherein said determining the join selectivity for two columns is further based on a skew calculation that provides a correction if the two columns have different row count to unique entry count ratios.

* * * * *